(12) United States Patent
Subramanian et al.

(10) Patent No.: US 10,585,793 B2
(45) Date of Patent: Mar. 10, 2020

(54) ALLOCATING SHARED MEMORY BLOCKS TO TABLE ENTRIES TO STORE IN A MEMORY DEVICE

(71) Applicant: INTEL CORPORATION, Santa Clara, CA (US)

(72) Inventors: Shiva Shankar Subramanian, Singapore (SG); Pinxing Lin, Singapore (SG)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/912,463

(22) Filed: Mar. 5, 2018

(65) Prior Publication Data
US 2019/0042404 A1 Feb. 7, 2019

(51) Int. Cl.
| G06F 12/00 | (2006.01) |
| G06F 9/00 | (2006.01) |
| G06F 12/02 | (2006.01) |
| G06F 12/1009 | (2016.01) |
| G06F 9/50 | (2006.01) |
| G06F 9/448 | (2018.01) |
| G06F 12/14 | (2006.01) |

(52) U.S. Cl.
CPC ........ *G06F 12/0246* (2013.01); *G06F 9/4498* (2018.02); *G06F 9/5016* (2013.01); *G06F 12/0292* (2013.01); *G06F 12/1009* (2013.01); *G06F 12/1483* (2013.01); *G06F 2212/656* (2013.01)

(58) Field of Classification Search
CPC ............. G06F 12/0246; G06F 12/0292; G06F 12/1009; G06F 12/1482; G06F 2212/656; G06F 9/4498; G06F 9/5016
See application file for complete search history.

(56) References Cited

U.S. PATENT DOCUMENTS

| 10,169,087 B2 * | 1/2019 | Accapadi .............. G06F 9/5016 |
| 2017/0262176 A1 * | 9/2017 | Kanno .................. G06F 3/0604 |
| 2018/0006906 A1 | 1/2018 | Subramanian et al. |

(Continued)

OTHER PUBLICATIONS

Herkersdorf et al "Hardware Acceleration of Signature Matching through Multi-Layer Transition Bit masking" [online] Date of Conference Dec. 7-9, 2016. [Retrieved on Feb. 5, 2019]. Retrieved from the Internet <URL: https://ieeexplore.ieee.org/document/7878812 > (Year: 2016).*

(Continued)

*Primary Examiner* — David Yi
*Assistant Examiner* — Dustin B. Fulford
(74) *Attorney, Agent, or Firm* — Konrad Raynes Davda & Victor LLP; David W. Victor

(57) ABSTRACT

Provided are an apparatus and method for allocating shared memory blocks to table entries to store in a memory device. A memory interface unit includes interface circuitry to connect to the blocks of the memory device. Requests are received to target addresses to access tables. For each request of the requests to a target address for a target table of the tables, the request is routed to a table block dedicated to the target table in response to the target address mapping to the table block and route the request to a shared memory block allocated to the target table in response to the target address mapping to the shared memory block allocated to the target table.

24 Claims, 9 Drawing Sheets

(56) References Cited

U.S. PATENT DOCUMENTS

2018/0006907 A1    1/2018  Lin et al.
2018/0203638 A1*   7/2018  Krueger ................ G06F 3/0604

OTHER PUBLICATIONS

U.S. Appl. No. 15/454,274, entitled "State Grouping Methodologies to Compress Transitions in a Deterministic Automata", invented by S. Subramanian et al., filed on Mar. 9, 2017, 51 pp.

* cited by examiner

| | Start Address | End Address |
|---|---|---|
| T1 Block0 | 0x0000 | 0x0FFF |
| T1 Block1 | 0x1000 | 0x1FFF |
| T2 Block0 | 0x2000 | 0x2FFF |
| T2 Block1 | 0x3000 | 0x3FFF |
| SM0 | 0x4000 | 0x43FF |
| SM1 | 0x4400 | 0x47FF |
| SM2 | 0x4800 | 0x4BFF |
| SM3 | 0x4C00 | 0x4FFF |

US 10,585,793 B2

ALLOCATING SHARED MEMORY BLOCKS TO TABLE ENTRIES TO STORE IN A MEMORY DEVICE

TECHNICAL FIELD

Embodiments described herein generally relate to allocating shared memory blocks to table entries to store in a memory device.

BACKGROUND

On-chip memories may be configured to include table information used by a processor in the chip, e.g., system-on-a-chip (SOC), having the on-chip memories. Over time, the table information may change.

There is a need in the art for improved techniques to allocate memory blocks to types of information used by the system, such as table information, to provide efficient allocation of memory blocks to store the different types of information.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

A hardware accelerator or other task dedicated processor may access information, such as table information, from memory blocks in a memory device. Initially, tables may be distributed across the memory blocks. However, if new table information is generated and deployed to the hardware accelerator, such as through a firmware update, the balance of entries in the tables may change, requiring a new allocation of memory blocks in the memory device to the different distribution of table entries. Described embodiments provide improvements to memory device computer technology to allow for dynamic adjustment of the allocation of table entries to the memory blocks in a memory device without having to change the memory device interface circuitry.

Described embodiments provide for dynamic allocation of memory blocks in a memory device architecture by having some or all of the memory blocks function as shared memory blocks that may be accessed through any paths that process requests. An ownership control register that may be dynamically modified by firmware/software, indicates the allocation of shared memory blocks, accessible to all request paths, to tables. The ownership control register is used to indicate the allocation of shared memory blocks to one of the tables so that the circuitry enforces this allocation. In this way, requests concurrently processed to different tables cannot be forwarded to a shared memory block allocated to store data for one table.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
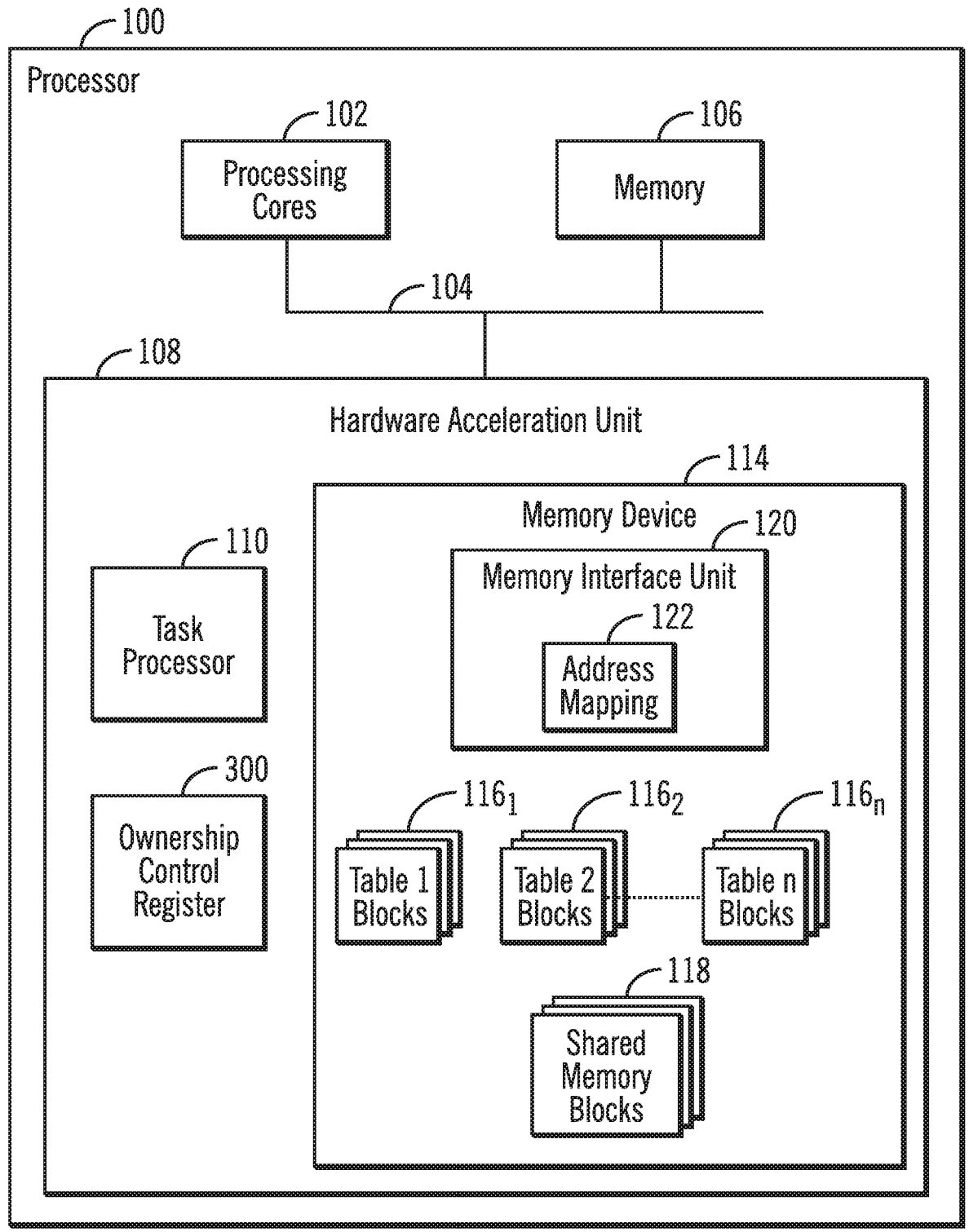
FIG. 1 illustrates a processor in which embodiments are implemented.

FIG. 1 illustrates an embodiment of a processor 100, such as a system-on-a-chip (SOC) comprised of multiple integrated circuit dies, including a plurality of processing cores 102 that connect via a bus 104 to a memory 106 and a hardware acceleration unit 108 to perform specific data processing operations, such as compression/decompression, encryption/decryption, deduplication, deep packet inspection, etc. The hardware acceleration unit 108 may include a task processor 110 to perform a specific task, such as compression/decompression, encryption/decryption, deduplication, etc. The term "bus" as used herein refers to a high level representation of the hardware components and circuitry that connect different coupled devices, and different devices may communicate or not communicate with any other device.

A memory interface unit 120 provides the circuitry used to direct requests to dedicated table blocks $116_1$, $116_2$ . . . $116_n$ and shared memory blocks 118. The memory interface unit 120 includes an address mapping 122 used to determine memory addresses that map to blocks $116_1$, $116_2$ . . . $116_n$, 118 in the memory device 114 having information used by the task processor 110 operations. The address mapping 122 maps ranges of addresses available in the memory device 114 to the blocks $116_1$, $116_2$ . . . $116_n$, 118. The table blocks $116_1$, $116_2$ . . . $116_n$ are dedicated to storing entries for n respective tables used by the task processor 110 for task processor operations, and the shared memory blocks 118 may be dynamically allocated to the tables by updates to firmware. The address mapping 122 may be fixed during the architecture phase, and remains fixed during deployment even as the allocation of the shared memory blocks 118 to tables may dynamically change.

Figures 2, 3:
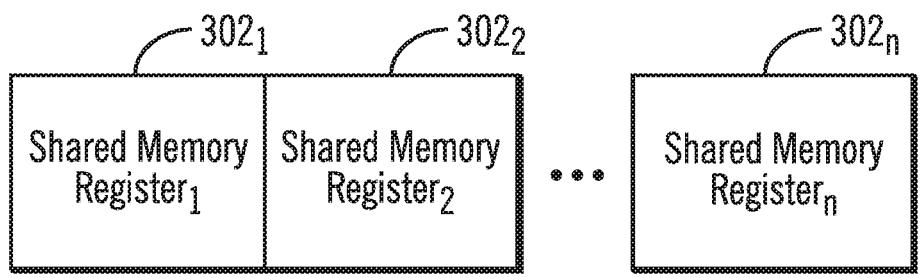
FIG. 2 illustrates an embodiment of an address mapping.
FIG. 3 illustrates an embodiment of an ownership control register entry to indicate an allocation of a shared memory block to a table.

FIG. 2 provides an example of an address mapping 200 as providing ranges of address for two blocks dedicated to table 1 (T1 Block0, T1 Block1), two blocks dedicated to table 2 (T2 Block0, T2 Block1), and address ranges for four shared memory blocks, e.g., SM0, SM1, SM2, SM3, that may be dynamically allocated to tables. The address mapping 122, 200 may be implemented as pre-configured logic circuits inside the memory interface unit 120. In alternative embodiments, the address mapping 122, 200 may be implemented in software tables.

The hardware acceleration unit 108 or other component further includes an ownership control register 300 that includes an entry for each shared memory block 118 indicating the table to which the shared memory block 118 is allocated. The ownership control register 300 may be dynamically programmed through firmware updates to the hardware acceleration unit 108. The ownership control register 300 may be used to drive select signals to the memory interface unit 120 to ensure that requests are directed to shared memory blocks allocated to the target table to which the requests are directed. With this structure, if requests are simultaneously received, such as on a same clock cycle, at the memory interface unit 120 to the tables, such that one request is received for each table, the select signals driven by the ownership control register 300 ensure that that the requests are only directed to shared memory blocks 118 allocated to the target table of the request so that the multiple concurrent requests are not gated to the same shared memory block 118.

A "table" as that term is used herein refers to any grouping, object or arrangement of information which is stored in the memory device 114, e.g., on-chip memory.

The memory device 114 may be comprised of a non-volatile memory device, such as a Static Random Access Memory (SRAM). In alternative embodiments, other types of non-volatile memory devices may be used including, but not limited, NAND dies (e.g., single level cell (SLC), multi-level cell (MLC), triple level cell (TLC) NAND memories, etc.), non-volatile random access memory, ferroelectric random-access memory (FeTRAM), nanowire-based non-volatile memory, three-dimensional (3D crosspoint) memory, phase change memory (PCM), memory that incorporates memristor technology, Magnetoresistive random-access memory (MRAM), Spin Transfer Torque (STT)-MRAM, SRAM, storage devices, etc. In certain embodiments, the 3D crosspoint memory may comprise a transistor-less stackable cross point architecture in which memory cells sit at the intersection of word lines and bit lines and are individually addressable and in which bit storage is based on a change in bulk resistance.

FIG. 3 illustrates an embodiment of the ownership control register as including an entry $302_1, 302_2 \ldots 302_n$ for each shared memory block 118 indicating the table to which the shared memory block is allocated or indicating no allocation to a table.

Figure 4:
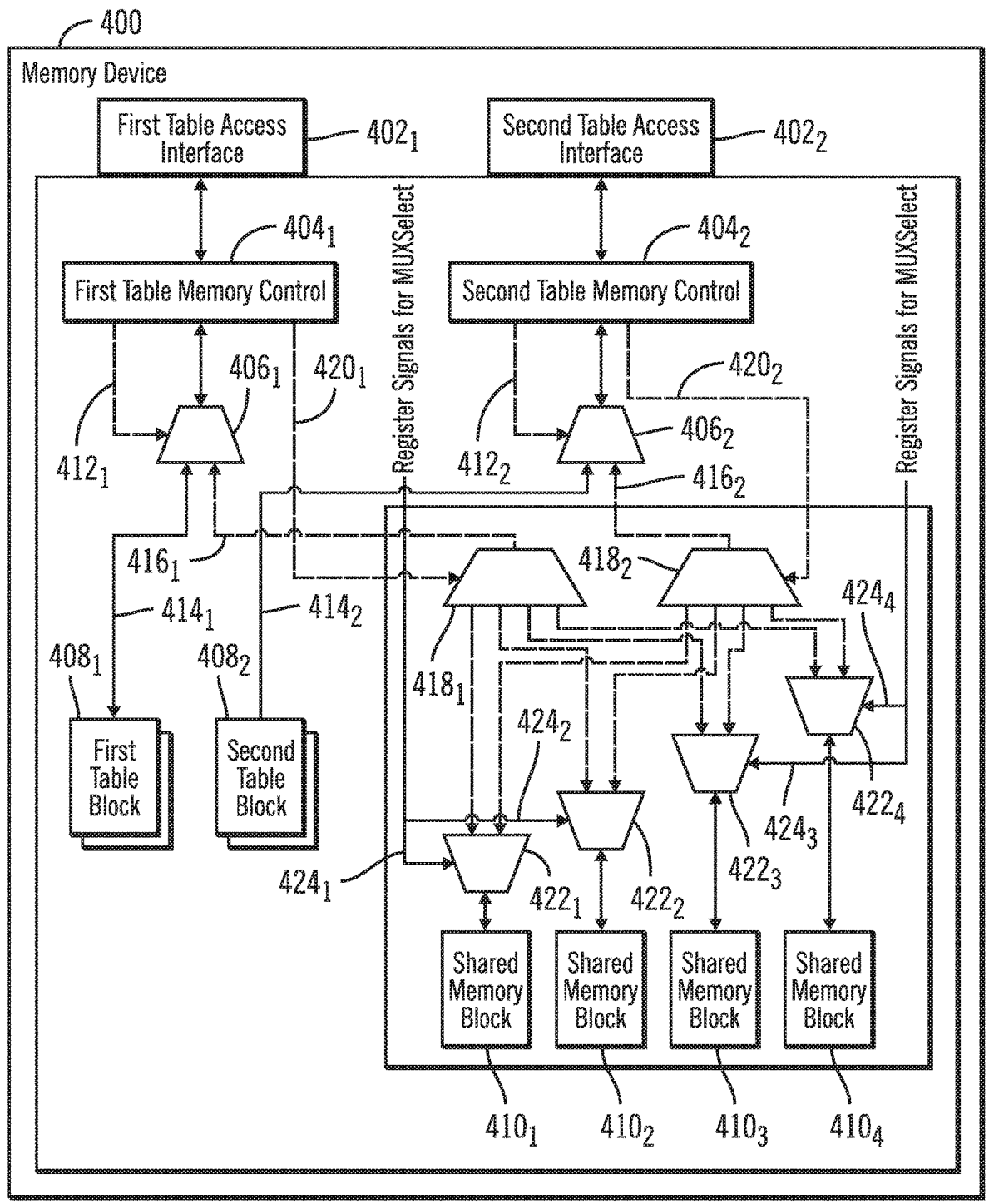
FIG. 4 illustrates an embodiment of a memory device.

FIG. 4 illustrates an embodiment of a memory device 400, which may comprise the memory device 114 in FIG. 1. The memory device 400 is shown as providing interface circuitry for two tables, a first and second tables. However, in further embodiments, the described interface circuitry for each table stored in the memory device 400 may include additional instances of circuitry for additional tables. The memory device 400 includes a first table access interface $402_1$ and second table access interface circuitry $402_2$ dedicated to requests for one of the first and second tables are received.

In certain embodiments, requests to each of the first and second tables may be received on a same clock cycle and processed simultaneously throughout the memory device 400 to allow for parallel processing and access to the memory blocks. The request received at the table access interfaces $402_1$, $402_2$ is forwarded to respective first $404_1$ and second $404_2$ table memory controls, which route the requests to a selection device $406_1$, $406_2$, such as a demultiplexer. The table memory controls $404_1$ and $404_2$ may each include an instance of the address mapping 122.

The first $404_1$ and second $404_2$ table memory controls determine from the address mapping 122, which may be implemented in pre-configured logic circuits inside the first $404_1$ and second $404_2$ table memory control, whether a target address of the first and second request is directed to a dedicated first table block $408_1$ and second table block $408_2$ (such as table blocks $116_1 \ldots 116_n$), respectively, and/or one of the shared memory blocks $410_1$, $410_2$, $410_3$, $410_4$ (such as shared memory blocks 118) allocated to the first and second table. The first $404_1$ and second $404_2$ table memory controls send a select signal $412_1$ and $412_2$ instructing the respective table selection device $406_1$ and $406_2$ to transfer the request on a path $414_1$ and $414_2$ to the dedicated table blocks $408_1$ and $408_2$ or on a path $416_1$ and $416_2$ to a shared memory selection device $418_1$ and $418_2$ respectively. The first or second request may be directed to dedicated and/or shared memory blocks. The first $404_1$ and second $404_2$ table memory controls may further determine the shared memory block $410_1$, $410_2$, $410_3$, $410_4$ to which the first and second requests are directed and send a select signal $420_1$, and $420_2$ to cause the respective shared memory selection device $418_1$ and $418_2$ to direct the request input received on paths $416_1$ and $416_2$ to a shared memory block selection device $422_1$, $422_2$, $422_3$, $422_4$ coupled to the shared memory block $410_1$, $410_2$, $410_3$, $410_4$ having the first and second target address of the first request and second request, respectively.

Each shared memory block selection device $422_1$, $422_2$, $422_3$, $422_4$ receives a select signal $424_1$, $424_2$, $424_3$, $424_4$ driven by the ownership control register 300 that signals the shared memory block selection devices $422_1$, $422_2$, $422_3$, $422_4$ to only take input from the shared memory selection device $418_1$, $418_2$ for the table identified in the shared memory register $302_1$, $302_2 \ldots 302_n$ driving the select signal $424_1$, $424_2$, $424_3$, $424_4$. In this way, the ownership control register 300 and the shared memory block selection device $422_1$, $422_2$, $422_3$, $422_4$ are the final checkpoint that ensures that only requests to the table stored in the shared memory block $410_1$, $410_2$, $410_3$, $410_4$ are forwarded to the shared memory block $410_1$, $410_2$, $410_3$, $410_4$ from interface circuitry.

The described embodiments provide interface circuitry that ensures that requests are only directed to a memory block allocated to the table. The interface circuitry dedicated to each table, beginning at the table memory control $404_1$, $404_2$ for a table, ensures that a request for a table presented on the interface circuitry and table memory control for the table is only directed to the dedicated table blocks $408_1$, $408_2$ having data for that table. Moreover, the architecture of FIG. 4 provides shared memory blocks $410_1$, $410_2$, $410_3$, $410_4$ that are connected to the interface circuitry for all the tables. Described embodiments provide the ownership control register 300 to ensure that only requests from the interface circuitry for the table to which the shared memory block $410_1$, $410_2$, $410_3$, $410_4$ is allocated are forwarded to the shared memory block $410_1$, $410_2$, $410_3$, $410_4$ by causing the shared memory block selection device $422_1$, $422_2$, $422_3$, $422_4$ to only select the input from the interface circuitry for the table to which the shared memory block is allocated. This restriction avoids having two requests simultaneously access a shared memory block, because the simultaneously processed requests are only allowed to proceed to the shared memory block allocated to the table to which the request is directed.

Further, by reprogramming the ownership control register 300 with a firmware update, the shared memory blocks may be dynamically assigned to different tables and the select signals would prevent requests from being directed to a shared memory table not storing entries for the table that is the target of the request.

If the interface circuity allows access to more than two tables as shown in FIG. 4, then there would be an additional instance i of the interface circuitry, comprising components $402_i$, $404_i$, $406_i$, $412_i$, $414_i$, $416_i$, $418_i$, $420_i$, for each table i added to the memory blocks, that provides connection to the dedicated table block $408_i$ for the additional table i and connection to all the shared memory blocks $410_1$, $410_2$, $410_3$, $410_4$. The ownership control register 300 restricts requests to table i only be forwarded to the shared memory blocks $410_1$, $410_2$, $410_3$, $410_4$ allocated to table i. The ownership control register comprises a register pool, in which there is a register entry $302_j$ for each shared memory block $410_j$ to indicate an assignment of tables to the shared memory blocks $410_j$.

The ownership control shared memory register $302_j$ would need to be expressed by a number of bits equal to the $\log_2$ base ceiling of n, where n is the number of tables, so that two tables requires 1 bit, 3-4 tables requires 2 bits, 5-8 tables requires 3 bits, and 9-16 tables require 4 bits, etc. Further, if additional shared memories are added, then an additional instance of the shared memory block selection device $422_j$ and the select signal $424_j$ are needed.

Further, the operations at the same mirror components in the interface circuitry for the different tables may be processed on the same clock cycles so requests to the tables are concurrently processed as they flow through the memory device 114, 400.

Figure 5:
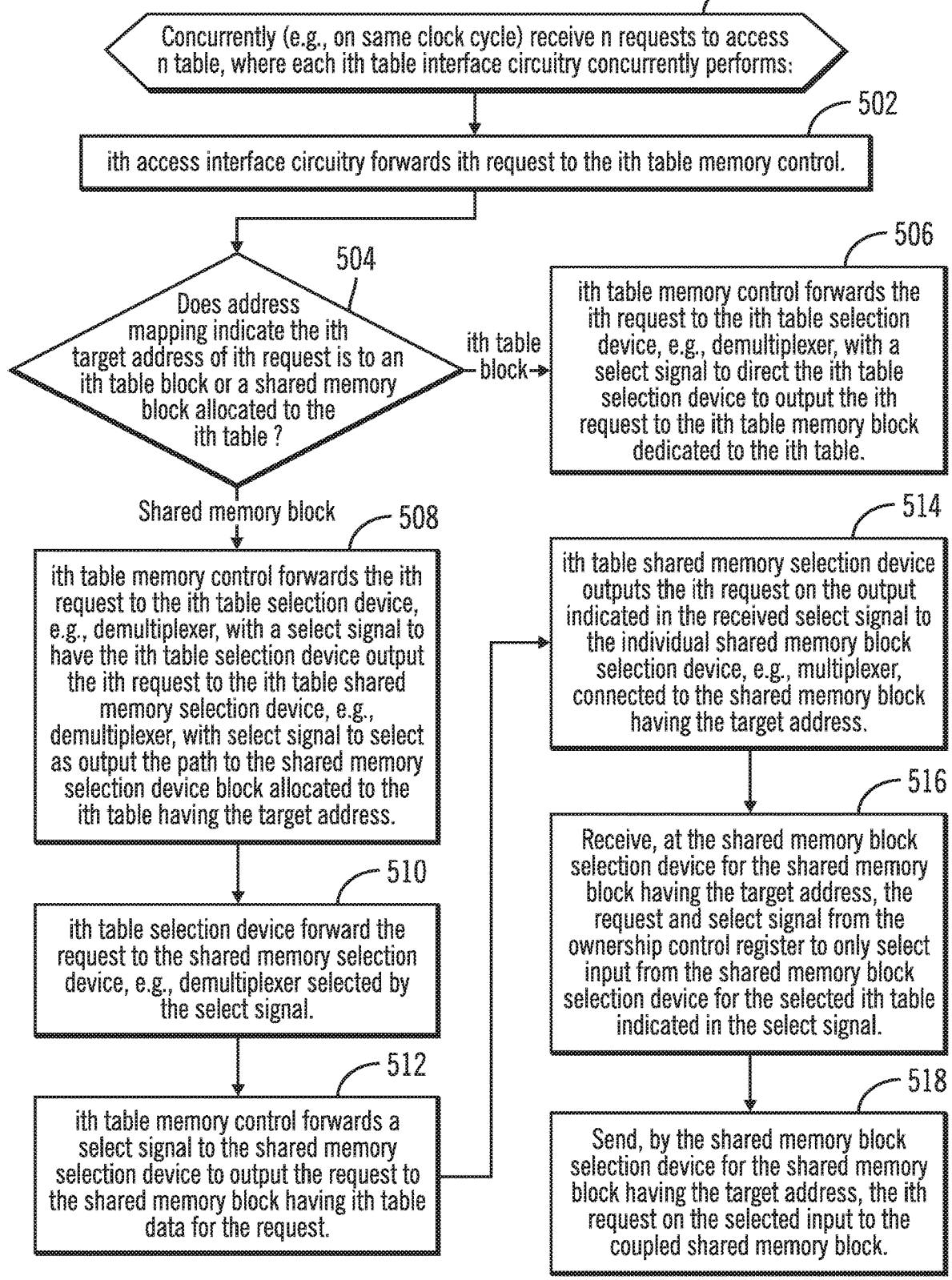
FIG. 5 illustrates an embodiment of operations to process requests to access table entries stored in the memory device.

FIG. 5 illustrates an embodiment of operations performed by the components in FIG. 4 to process concurrent requests to n tables stored in the memory blocks $408_1$, $408_2$, $410_1$, $410_2$, $410_3$, $410_4$. In the example of FIG. 4, n equals two, for two tables. However, in further embodiments, there may be more than two tables stored in the fixed table blocks $408_i$ and shared memory blocks $410_j$. Additional tables requires more bits to represent the table number in the shared memory register $302_j$ for shared memory j, which may comprise a number of bits equal to the ceiling of the $\log_2$ of the number of tables. Upon concurrently receiving (at block 500) n requests toward n tables, which may be on the same clock cycle, each ith table access interface $402_i$, where i designates the interface circuitry for any of the tables, forwards (at block 502) the ith request to the ith table memory control $404_i$. The ith table memory control $404_i$ determines (at block 504) from the address mapping 122 in logic circuits whether the ith target address of the ith request is in a dedicated ith table block $408_i$ or a shared memory block $410_j$ allocated to the ith table. If (at block 504) the target address is directed to a dedicated ith table block $408_i$, then the ith table memory control $404i$ forwards (at block 506) the ith request to the ith table selection device $406_i$, such as a demultiplexer or other selection device, with a select signal $412_i$ to direct the ith table selection device $406_i$ to output the ith request to the ith table block $408_i$ having the ith address. If (at block 504) the target address is directed to a shared memory block $410_j$, then the ith table memory control $404_i$ forwards (at block 508) the ith request to the ith table selection device $406_i$ with a select signal $412_i$ to have the ith table selection device $406_i$ output the ith request to the ith table shared memory selection device $418_i$, e.g., demultiplexer or other selection device. The ith table selection device $406_i$ forwards (at block 510) the request to the shared memory selection device $418_i$, e.g., demultiplexer, selected by the select signal $412_i$. The ith table memory control $404_i$ forwards (at block 514) a select signal $420_i$ to the shared memory selection device $418_i$ to output the request to the shared memory block $410_j$ having ith table data for the request. The request (forwarded at block 510) and the select signal $420_i$ (forwarded at block 512) may be forwarded on the same clock cycle to arrive at the shared memory selection device $418_i$ at the same time.

Upon receiving the select signal $420_i$ and forwarded request, the ith table shared memory selection device $418_i$ outputs (at block 514) the ith request on the output indicated in the received select signal $420_i$ to the shared memory block selection device $422_j$, e.g., multiplexer, connected to the shared memory block $410_j$ having the target address. The shared memory block selection device $422_j$, for the shared memory block $410_j$ having the target address, receives (at block 516) the request and select signal $424_j$ driven from the ownership control register entry $302_j$ to only select input from the shared memory selection device $418_i$ for the selected ith table indicated in the select signal $424_j$. The shared memory block selection device $422_j$ sends (at block 518) the request from the selected input to the coupled shared memory block $410_j$.

In described embodiments, there are two levels of demultiplexers to classify the memory access. The first level of demultiplexers, e.g., $406_1$, $406_2$, each either selects the dedicated table blocks $408_1$, $408_2$, respectively, or the shared memory blocks $410_1$, $410_2$, $410_3$, $410_4$. The second level demultiplexer $418_1$, $418_2$ selects the path to the shared memory $410_1$, $410_2$, $410_3$, $410_4$ to which the transaction is directed to. The select signal $420_1$, $420_2$ for the second level demultiplexer $418_1$, $418_2$ is generated based on the incoming address of the transaction falling into a specific memory range defined in the address mapping 122 in the logic circuits within the table memory control $404_i$. The demultiplexers $418_1$, $418_2$ make sure that the incoming read or write transaction is only directed to one of the physical memory blocks among the shared memories.

Once a transaction is directed to the shared memories, the path is selected through a multiplexer $424_1$, $424_2$, $424_3$, $424_4$ whose select signal is programmed through the ownership control register 300 bits generated by a compiler. The ownership bit is preloaded to the accelerator as a control register and is directly connected to the select signal $424_1$, $424_2$, $424_3$, $424_4$. The ownership bit makes sure that the transaction is directed towards the shared memory and there is no contention with respect to any of the memory accesses.

Described embodiments eliminate physical memory contention issues. This is due to the fact that either the dedicated table block (e.g., first or second) or the shared memory is accessed based on the incoming address coming into the memory control blocks. The multiplexer inside the shared memory access makes sure that a piece of physical memory is either accessed by memory access interfaces without any contention issues.

Figure 6:
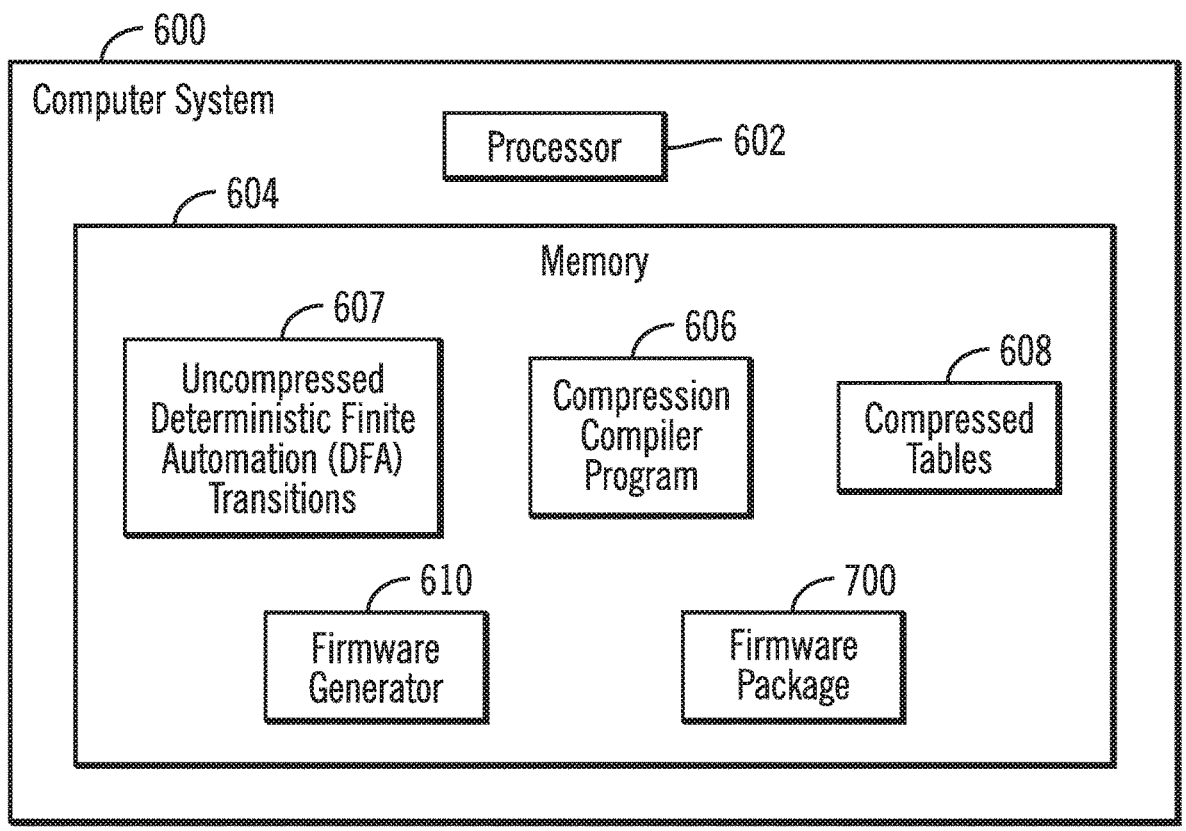
FIG. 6 illustrates an embodiment of a computer system to generate a firmware package to modify the allocation of shared memory blocks to tables.

FIG. 6 illustrates an embodiment of a computer system 600 to generate a firmware package 700 to the ownership control register 300 and tables with updated table information, where the ownership control register 300 may alter the allocation of shared memory blocks to tables. The computer system 600 includes a processor 602 and memory 604, where the memory 604 stores program elements executed and processed by the processor 602, including a compression compiler program 606 to receive uncompressed information 607, such as deterministic finite automation (DFA), and generate compressed tables 608 to be stored in the memory blocks. The compressed tables 608 may comprise first and second tables stored in first $408_1$ and second $408_2$ table blocks, as well as shared memory blocks $410_j$ allocated for a specific table block that may be allocated dynamically based on the storage needs of the table. A firmware generator 610 stored in the memory 604 generates the firmware package 700 with the information to update in the memory device 114, 400. The compression compiler program 606 may comprise other types of compiler programs to generate tables to update in the memory device 114, 400 and shared memory block allocation for updated table information.

Figure 7:
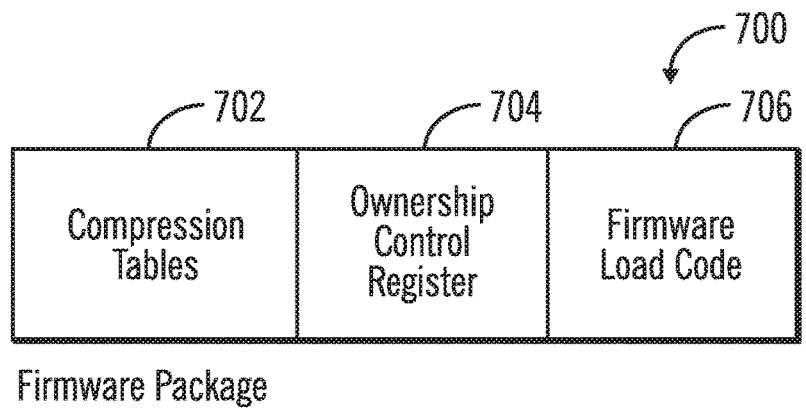
FIG. 7 illustrates an embodiment of a firmware package.

FIG. 7 illustrates an embodiment of the firmware package 700 generated by the firmware generator 610, and includes the compression tables 702, such as compression tables 608; an ownership control register 704, such as ownership control register 300; and firmware load code 706 to load the compression tables into the table blocks $408_1$, $408_2$, $410_1$, $410_2$, $410_3$, $410_4$ and update the ownership control register 300.

Figure 8:
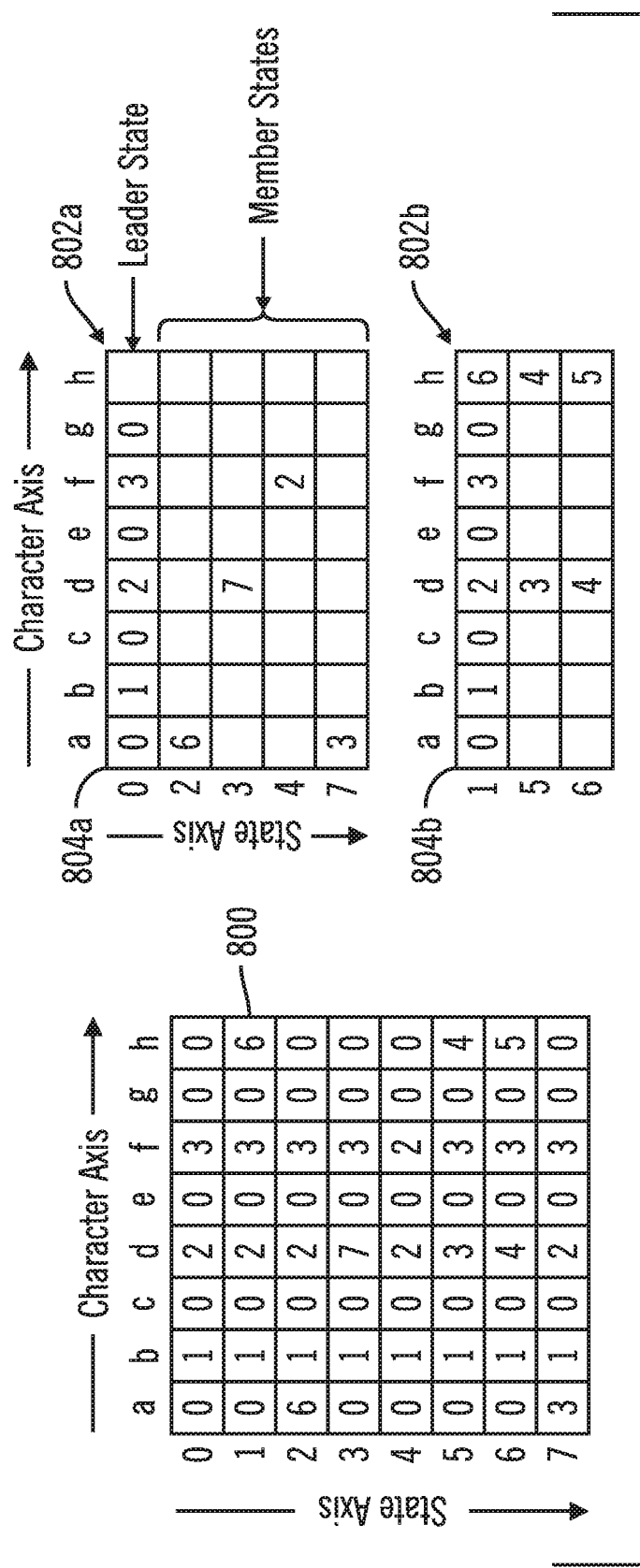
FIG. 8 illustrates an embodiment of an example of compression table entries.

FIG. 8 shows an example 800 of the uncompressed Deterministic Finite Automation (DFA) 607, as having a two-dimensional state table with states in the horizontal axis and the characters in the vertical axis. This example comprises eight states and state transitions for each state corresponding to eight characters a to h. In actual implementations, there will be state transitions for 256 characters. The number of states is determined by the number of signatures and the characteristics of the signatures. The compiler 606 compresses the transitions 800 to generate compressed state transitions 802a and 802b by compressing redundant state transitions from the DFA 800. The compiler 606 may utilize a compression algorithm that compresses DFA transitions by compressing redundant state transitions used for deep packet inspection (DPI) in a network processor, such as such as disclosed in U.S. Patent Publication No. 2018006906, published Jan. 4, 2018, which Patent Publication is incorporated herein by reference in its entirety.

After compressing the transitions, the compressed state transitions are split into groups of compressed transitions 802a, 802b. The transitions in the first row 804a, 804b of the compressed transition groups 802a, 802b comprise leader transitions and the compressed transitions in the rows following the leader transitions 804a, 804b comprise member transitions that include the values from the corresponding leader transition in the table 802a, 802b, having values that differ by the values provided for the member transitions. The leader and member transitions may be stored in separate tables in the memory device 400, where the leader transition and member transition may be accessed in the same clock cycle.

FIG. 8 provides one example of the content of the tables that may be stored in the table blocks $408_1$, $408_2$, $410_1$, $410_2$, $410_3$, $410_4$. In alternative embodiments, other types of information for other types of processes, including processes other than for compression, may be stored in the tables than described with respect to FIG. 8.

Figure 9:
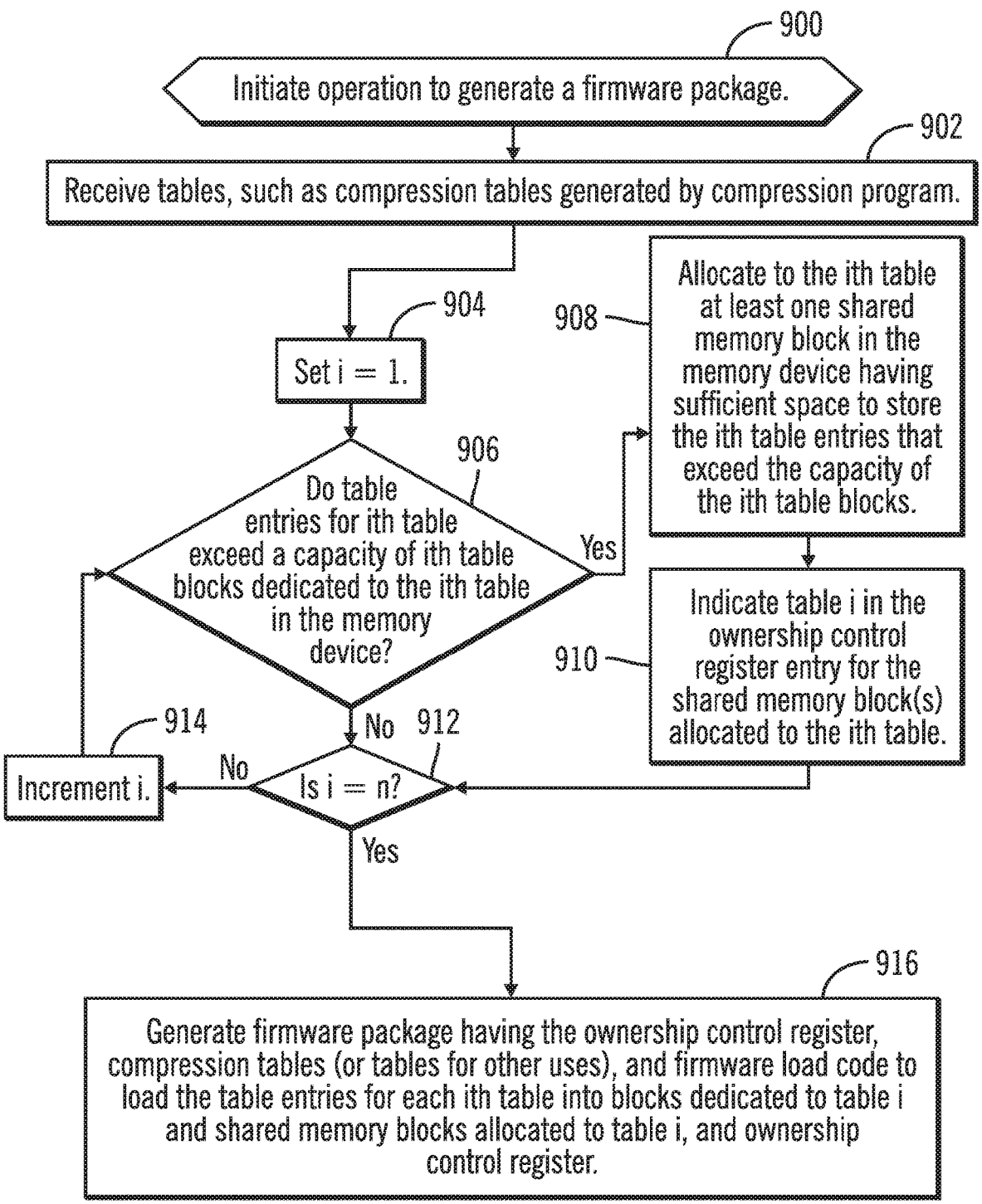
FIG. 9 illustrates an embodiment of operations to generate a firmware package.

FIG. 9 illustrates an embodiment of operations performed by the firmware generator 610 to generate a firmware package 700 to deploy to a memory device 114, 400 to update the ownership control register 300, providing the allocation of shared memory blocks $410_1$, $410_2$, $410_3$, $410_4$ to the tables, and the storage of new table entries in a new combination of memory blocks $408_1$, $408_2$, $410_1$, $410_2$, $410_3$, $410_4$. In this way, the architecture of the memory device 400 allows for dynamic adjustment of how table entries are stored in the shared memory blocks $410_1$, $410_2$, $410_3$, $410_4$ to allow for changes to the tables used by the task processor 110. Upon initiating (at block 900) an operation to generate the firmware package 700, the firmware generator 610 receives (at block 902) n tables, such as compression tables 608 generated by compression compiler program 606, to deploy to memory devices 114, 400. A variable i is set (at block 904) to one. If (at block 906) the table entries for an ith table exceed a capacity of the ith table blocks $408_i$ dedicated to the ith table in the memory device 114, 400, then the firmware generator 610 allocates (at block 908) to the ith table at least one shared memory block $410_1 \ldots 410_n$ in the memory device 400 having sufficient space to store the ith table entries that exceed the capacity of the ith table blocks $408_i$. The firmware generator 610 indicates (at block 910) table i in the ownership control register entry $302_j$ for the shared memory blocks(s) allocated to the ith table.

If (at block 906) the table entries in the new table i do not exceed the capacity of the dedicated table blocks $408_i$ or after allocating shared memory blocks to the table i (at block 910), then if (at block 912) i is not equal to n, i.e., all tables have not been processed, then variable i is incremented (at block 914) and control proceeds back to block 906 to determine whether to allocate shared memory blocks to the next table. After all n tables have been considered (from the yes branch of block 912), the firmware generator 610 generates (at block 916) a firmware package 700 having the new compression tables 702, such as 608, such as with the leader and member state transitions, the ownership control register 704; and the firmware code load 708. This firmware package 700 may be deployed in the memory devices 114, 400 for use by the hardware With the described embodiment firmware table generation process, all the shared memory instances can be allocated to just one of the tables, none of the shared memory instances are allocated to any of the tables, or the shared memories are partially distributed between the tables.

With the described firmware package generator operations, the tables may be updated and a new allocation of table entries among the shared memory blocks is determined to accommodate changes to the tables. This firmware package 700 may be distributed to the deployed processors 100 to update the shared memory block allocations in the ownership control register 704 and store the table entries in the new allocation of the shared memory blocks. In this way, the allocation of memory blocks in the already deployed memory devices 114, 400 may be modified and be used in the current interface circuitry of the memory device 114, 400 because the updated ownership control register 300 enforces the new shared table block assignment by ensuring that requests to a table are only directed to the new allocation of shared memory blocks to table entries.

Figure 10:
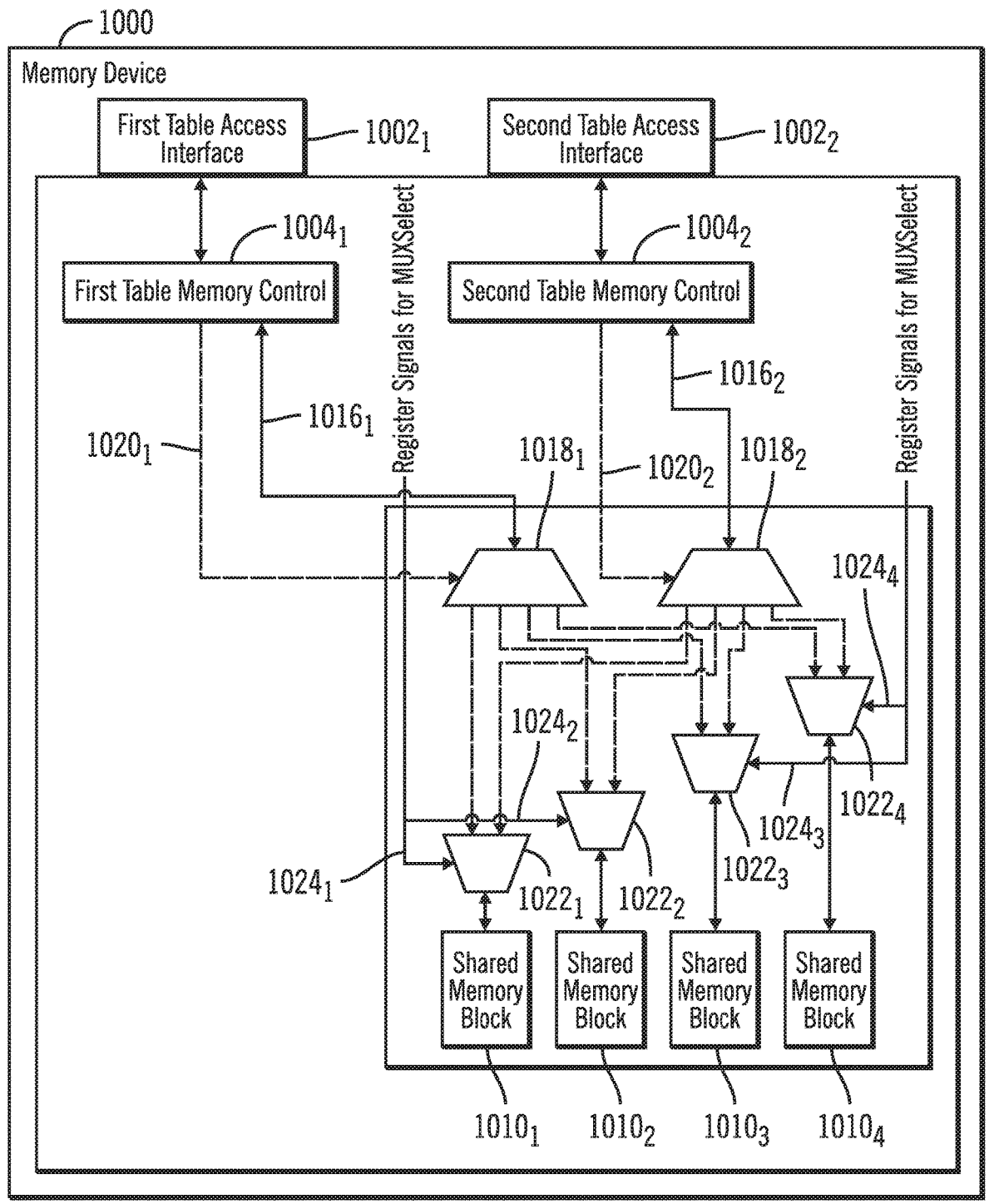
FIG. 10 illustrates an additional embodiment of a memory device.

FIG. 10 illustrates a memory device 1000 comprising an alternative embodiment of the memory device 400 of FIG. 4 that has all shared blocks and no dedicated table blocks, such as table blocks $408_1$, $408_2$ in FIG. 4. Instead, in FIG. 10, all the memory blocks comprise shared memory blocks that would be allocated according to the control register 300 when the firmware package 700 is generated. For instance, the firmware generator 610 would allocate enough shared blocks to store the transitions or entries for each of the tables, so that all the blocks used for each of the tables would comprise shared blocks allocated according to the ownership control register 300.

The memory device 1000 is shown as providing interface circuitry for two tables, a first and second tables. However, in further embodiments, the described interface circuitry for each table stored in the memory device 1000 may include additional instances of circuitry for additional tables. The memory device 1000 includes a first table access interface 1002$_1$ and second table access interface circuitry 1002$_2$ dedicated to requests for one of the first and second tables are received. In certain embodiments, requests to each of the first and second tables may be received on a same clock cycle and processed simultaneously throughout the memory device 1000 to allow for parallel processing and access to the memory blocks. The request received at the table access interfaces 1002$_1$, 1002$_2$ is forwarded to respective first 1004$_1$ and second 1004$_2$ table memory controls.

The first 1004$_1$ and second 1004$_2$ table memory controls determine from the address mapping 122 maintained in the table memory controls 1004$_1$, 1004$_2$, the shared memory block 1010$_1$, 1010$_2$, 1010$_3$, 1010$_4$ to which the first and second requests are directed and sends the first and second requests on paths 1016$_1$ and 1016$_2$ to a shared memory block selection device 1022$_1$, 1022$_2$, 1022$_3$, 1022$_4$ coupled to the shared memory block 1010$_1$, 1010$_2$, 1010$_3$, 1010$_4$ having the first and second target address of the first request and second request, respectively. The first 1004$_1$ and second 1004$_2$ table memory controls send a select signal 1020$_1$ and 1020$_2$ to cause the respective shared memory selection device 1018$_1$ and 1018$_2$ to direct the request input received on paths 1016$_1$ and 1016$_2$ to a shared memory block selection device 1022$_1$, 1022$_2$, 1022$_3$, 1022$_4$ coupled to the shared memory block 1010$_1$, 1010$_2$, 1010$_3$, 1010$_4$ having the first and second target address of the first request and second request, respectively.

Each shared memory block selection device 1022$_1$, 1022$_2$, 1022$_3$, 1022$_4$ receives a select signal 1024$_1$, 1024$_2$, 1024$_3$, 1024$_4$ driven by the ownership control register 300 that signals the shared memory block selection devices 1022$_1$, 1022$_2$, 1022$_3$, 1022$_4$ to only take input from the shared memory selection device 1018$_1$, 1018$_2$ for the table identified in the shared memory register 302$_1$, 302$_2$ . . . 302$_j$ driving the select signal 1024$_1$, 1024$_2$, 1024$_3$, 1024$_4$. In this way, the ownership control register 300 and the shared memory block selection device 1022$_1$, 1022$_2$, 1022$_3$, 1022$_4$ are the final checkpoint that ensures that only requests to the table stored in the shared memory block 1010$_1$, 1010$_2$, 1010$_3$, 1010$_4$ are forwarded to the shared memory block 1010$_1$, 1010$_2$, 1010$_3$, 1010$_4$ from interface circuitry.

The described embodiments provide interface circuitry that ensures that requests are only directed to a shared memory block allocated to the table. The interface circuitry for each table connects to the same shared memory blocks 1010$_1$, 1010$_2$, 1010$_3$, 1010$_4$ that are connected to the interface circuitry for all the tables. Described embodiments provide the ownership control register 300 to ensure that only requests from the interface circuitry for the table to which the shared memory block 1010$_1$, 1010$_2$, 1010$_3$, 1010$_4$ is allocated are forwarded to the shared memory block 1010$_1$, 1010$_2$, 1010$_3$, 1010$_4$ by causing the shared memory block selection device 1022$_1$, 1022$_2$, 1022$_3$, 1022$_4$ to only select the input from the interface circuitry for the table to which the shared memory block is allocated. This restriction avoids having two requests simultaneously access a shared memory block, because the simultaneously processed requests are only allowed to proceed to the shared memory block allocated to the table to which the request is directed.

Further, by reprogramming the ownership control register 300 with a firmware update, the shared memory blocks may be dynamically assigned to different tables and the select signals would prevent requests from being directed to a shared memory table not storing entries for the table that is the target of the request. This dynamic allocation of the shared memory blocks allows for reassignment of shared memory blocks depending on changes to the distribution of entries in the tables.

If the interface circuity allows access to more than two tables as shown in FIG. 10, then there would be an additional instance i of the interface circuity, comprising components 1002$_i$, 1004$_i$, 1016$_i$, 1018$_i$, and 1020$_i$, for each table i added to the memory blocks, that provides connection to all the shared memory blocks 1010$_1$, 1010$_2$, 1010$_3$, 1010$_4$. The shared memory register 302$_j$ for the additional table i is connected to the shared memory blocks requests and restricts request to be forwarded to the shared memory blocks 1010$_1$, 1010$_2$, 1010$_3$, 1010$_4$ allocated to table i. If there are two tables allocated to the shared memory blocks, then a single bit in 302 is sufficient to indicate either of the two tables as allocated to the shared memory block. If there are three or four tables, then two bits would be needed to identify the table allocated to the shared memory block.

Figure 11:
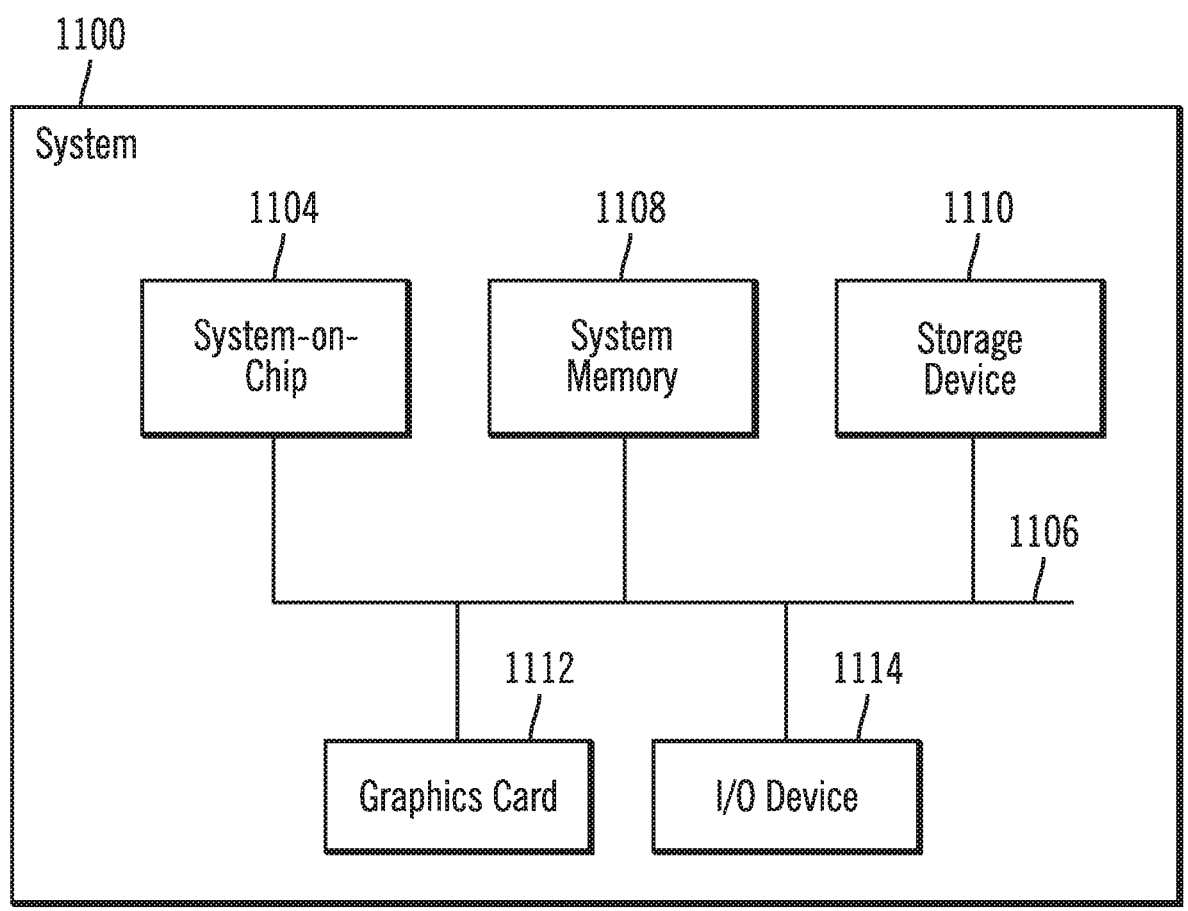
FIG. 11 illustrates a system in which the systems of FIGS. 1 and 6 may be deployed.

FIG. 11 illustrates an embodiment of a system 1100 in which the processor 100, e.g., system-on-a-chip (SOC), of FIG. 1 may be deployed as the system-on-chip 1104, a system memory 1108 and a storage device 1110 for long-term storage. The system 1100 may further reflect the architecture of the computer system 600. The processor 1104 may communicate over a bus 1106 with the system memory 1108, in which programs, operands and parameters being executed are cached, the non-volatile storage device 1110, a graphics card 1112, and other Input/Output (I/O) devices, e.g., display devices, ports, network interfaces, etc.

The described operations of the processing components, such as the compression compiler program 606 and firmware generator 610, and other components, may be implemented as a method, apparatus, device, and a computer program product comprising a computer readable storage medium implemented using standard programming and/or engineering techniques to produce software, firmware, hardware, or any combination thereof. The described operations may be implemented as code or logic maintained in a "computer readable storage medium". The term "code" and "program code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. A computer readable storage medium is not comprised solely of transmission signals and includes physical and tangible components. Those skilled in the art will recognize that many modifications may be made to this configuration without departing from the scope of the present invention, and that the article of manufacture may comprise suitable information bearing medium known in the art.

It should be appreciated that reference throughout this specification to "one structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

Example 1 is an apparatus coupled to a memory device including a plurality of blocks of memory cells, comprising: a memory interface unit, including interface circuitry to connect to the blocks of the memory device. The memory interface unit receives receive requests to target addresses to access tables and for each request of the requests to a target address for a target table of the tables, route the request to a table block dedicated to the target table in response to the target address mapping to the table block and route the request to a shared memory block allocated to the target table in response to the target address mapping to the shared memory block allocated to the target table.

In Example 2, the subject matter of examples 1 and 3-8 can optionally include that the requests to the tables are received at the interface circuitry on a same clock cycle.

In Example 3, the subject matter of examples 1, 2, and 4-8 can optionally include an ownership control register indicating each shared memory block of shared memory blocks as allocated to one of the tables. The ownership control register controls circuitry to restrict requests to a table to the shared memory block allocated to the table.

In Example 4, the subject matter of examples 1-3 and 5-8 can optionally include that the memory interface unit includes: table memory controls, wherein each table memory control of the table memory controls is to receive requests directed to one of the tables; and selection devices, wherein each selection device of the selection devices is coupled to one of the table memory controls, wherein to route, by each of the table memory controls, the request to the table block or to the shared memory block is to send a select signal to the selection device coupled to the table memory control, to output the request to the table block in response to the target address mapping to the table block dedicated to the target table and to output the request to the shared memory block allocated to the target table in response to the target address mapping to the shared memory block allocated to the target table.

In Example 5, the subject matter of examples 1-4 and 6-8 can optionally include That the memory interface unit includes: table memory controls, wherein each table memory control of the table memory controls is to receive requests directed to one of the tables and is coupled to at least one table block allocated to a table to which requests are received; and shared memory selection devices, wherein each shared memory selection device of the shared memory selection devices is coupled to the table memory control and all shared memory blocks, wherein the table memory control sends a select signal to the shared memory selection device coupled to the table memory control to only send the request to the shared memory block allocated to the table including the target address.

In Example 6, the subject matter of examples 1-5 and 7-8 can optionally include an ownership control register indicating each of the shared memory blocks as allocated to one of the tables and shared memory block selection devices coupled to the shared memory blocks. One of the shared memory block selection devices is coupled to one of the shared memory blocks, each of the shared memory selection devices is coupled to all of the shared memory block selection devices, and each of the shared memory block selection devices is to receive a select signal derived from the ownership control register indicating to select input from a shared memory selection device for the table allocated to a shared memory block coupled to the shared memory block selection device, to output to the shared memory block.

In Example 7, the subject matter of examples 1-6 and 8 can optionally include that the tables store compressed state transitions from a deterministic finite automata (DFA) and a decompression unit to decompress the state transitions from the tables to determine state transitions to use to validate an input string.

In Example 8, the subject matter of examples 1-7 can optionally include that a first table of the tables comprises leader state transitions and a second table of the tables stores a set of member state transitions for each leader state transition, wherein member state transitions from the leader state transitions by at least one character, wherein the leader and member state transitions are concurrently requested from the first and second tables.

Example 9 is an apparatus coupled to a memory device including a plurality of blocks of memory cells. A memory interface unit includes interface circuitry to connect to shared memory blocks of the memory device and to receive requests to target addresses to access tables, wherein the tables are stored in the shared memory blocks. For each request of the requests to a target address for a target table of the tables, the interface circuitry routes the request to a shared memory block allocated to the target table in response to the target address mapping to the shared memory block allocated to the target table. An ownership control register indicates each of the shared memory blocks as allocated to one of the tables, wherein the ownership control register controls circuitry to restrict requests to a table to the shared memory block allocated to the table.

In Example 10, the subject matter of examples 9, 11, and 12 can optionally include that the memory interface unit includes table memory controls, wherein each table memory control of the table memory controls is to receive requests directed to one of the tables and shared memory selection devices, wherein each shared memory selection device of the shared memory selection devices is coupled to one table memory control of the table memory control and all the shared memory blocks. The table memory control sends a select signal to the shared memory selection device coupled to the table memory control to only send the request to the shared memory block allocated to the table including the target address.

In Example 11, the subject matter of examples 9, 10, and 12 can optionally include that the memory interface unit further includes shared memory block selection devices coupled to the shared memory blocks, wherein one of the shared memory block selection devices is coupled to one of the shared memory blocks. Each of the shared memory selection devices is coupled to all of the shared memory block selection devices, wherein each of the shared memory block selection devices is to receive a select signal derived from the ownership control register indicating to select input from a shared memory selection device for the table allocated to the shared memory block coupled to the shared memory block selection device, to output to the shared memory block.

In Example 12, the subject matter of examples 9, 10, and 11 can optionally include that the ownership control register is dynamically configurable to enable any of the shared memory blocks to be allocated to any of the tables.

Example 13 is a computer program product to generate firmware for a memory device having a plurality of blocks of memory cells, wherein the computer program product comprises at least one computer readable storage medium including program code executed by a processor to: for each of the tables having table entries to store in blocks of the memory device, allocate at least one shared memory block of shared memory blocks in the memory device having sufficient space to store the table entries; generate a firmware package indicating an allocation of the shared memory blocks to the tables and the table entries for the tables to store in the memory device, wherein deployment of the firmware package to the memory device causes the memory device to store the table entries for at least one of the tables in the shared memory blocks allocated to the table.

In Example 14, the subject matter of examples 13, 15, and 16 can optionally include that the program code is further executed to determine whether table entries for each table of a plurality of tables exceed a capacity of at least one dedicated table block dedicated to store entries for the table, wherein the shared memory blocks allocated to at least one table are to store the table entries that exceed the capacity of the at least one dedicated table block, wherein the deployment of the firmware package further causes the memory device to store the table entries for each of the tables in the dedicated table blocks and the shared memory blocks allocated to the table.

In Example 15, the subject matter of examples 13, 14, and 16 can optionally include that the program code is further executed to generate an ownership control register indicating each of the shared memory blocks as allocated to one of the tables; and include the ownership control register in the firmware package.

In Example 16, the subject matter of examples 13, 14, and 15 can optionally include that the allocation of the shared memory blocks to the tables comprises an allocation that is a member of a set of allocations comprising: all of the shared memory blocks are allocated to one of the tables; none of the shared memory blocks are allocated to any of the tables; and shared memory blocks are allocated to multiple of the tables.

Example 17 is a method to process requests to target address to access tables stored in a memory device including a plurality of blocks of memory cells, comprising: receiving requests to target addresses to access tables; and for each request of the requests to a target address for a target table of the tables, routing the request to a table block dedicated to the target table in response to the target address mapping to the table block and route the request to a shared memory block allocated to the target table in response to the target address mapping to the shared memory block allocated to the target table.

In Example 18, the subject matter of examples 17 and 19-24 can optionally include that the requests to the tables are received on a same clock cycle.

In Example 19, the subject matter of examples 17, 18, and 20-24 can optionally include restricting requests to a table to the shared memory block allocated to the table using an ownership control register indicating each shared memory block of shared memory blocks as allocated to one of the tables.

In Example 20, the subject matter of examples 17-19 and 21-24 can optionally include that the requests are received at table memory controls, wherein each table memory control of the table memory controls is to receive requests directed to one of the tables. The routing a request to a target address of the requests comprises: sending a select signal to a selection device coupled to the table memory control, to output the request to the table block in response to the target address mapping to the table block dedicated to the target table and to output the request to the shared memory block allocated to the target table in response to the target address mapping to the shared memory block allocated to the target table.

In Example 21, the subject matter of examples 17-20 and 22-24 can optionally include that the requests are received at table memory controls, wherein each table memory control of the table memory controls is to receive requests directed to one of the tables and is coupled to at least one table block allocated to a table to which requests are received; and sending, by a table memory control the table memory controls, a select signal to a coupled shared memory selection device to only send the request to the shared memory block allocated to the table including the target address, wherein each shared memory selection device of the shared memory selection devices is coupled to the table memory control and all shared memory blocks.

In Example 22, the subject matter of examples 17-21, 20, 21, 23, and 24 can optionally include receiving a select signal derived from an ownership control register, indicating each of the shared memory blocks as allocated to one of the tables, to select input from a shared memory selection device for the table allocated to a shared memory block coupled to a shared memory block selection device, to output to the shared memory block.

In Example 23, the subject matter of examples 17-22 and 24 can optionally include that the tables store compressed state transitions from a deterministic finite automata (DFA), further comprising: decompressing the state transitions from the tables to determine state transitions to use to validate an input string.

In Example 24, the subject matter of examples 17-23 can optionally include that a first table of the tables comprises leader state transitions and a second table of the tables stores a set of member state transitions for each leader state transition, wherein member state transitions for one of the leader state transitions differ from the leader state transitions by at least one character, wherein the leader and member state transitions are concurrently requested from the first and second tables.

What is claimed:

1. An apparatus coupled to a memory device including a plurality of blocks of memory cells, comprising:

a memory interface unit, including interface circuitry to connect to tables configured in the memory device, wherein each table of the tables is comprised of table blocks of memory addresses dedicated to the table, wherein at least one table of the tables is further allocated at least one shared memory block of shared memory blocks, wherein shared memory blocks are allocated to the tables through updates to firmware, wherein an address mapping is implemented in pre-configured logic circuits that maps ranges of addresses to the table blocks and the shared memory blocks of the memory device, wherein the interface circuitry is to:

receive requests to target addresses to access tables; and for each request of the requests to a target address for a target table of the tables, determine from the address mapping whether the target address is to a table block dedicated to the target table or a shared memory block allocated to the target table;

route the request to a table block dedicated to the target table in response to the address mapping indicating that the target address maps to the table block dedicated to the target table; and route the request to a shared memory block allocated to the target table in response to the address mapping indicating that the target address maps to the shared memory block allocated to the target table.

2. The apparatus of claim 1, wherein the requests to the tables are received at the interface circuitry on a same clock cycle.

3. The apparatus of claim 1, further comprising:

an ownership control register indicating each shared memory block of shared memory blocks as allocated to one of the tables, wherein the ownership control register controls circuitry to restrict requests to a table to the shared memory block allocated to the table.

4. The apparatus of claim 1, wherein the memory interface unit includes:

table memory controls, wherein each table memory control of the table memory controls is to receive requests directed to one of the tables; and selection devices, wherein each selection device of the selection devices is coupled to one of the table memory controls, wherein to route, by each of the table memory controls, the request to the table block or to the shared memory block is to send a select signal to the selection device coupled to the table memory control, to output the request to the table block in response to the target address mapping to the table block dedicated to the target table and to output the request to the shared memory block allocated to the target table in response to the target address mapping to the shared memory block allocated to the target table.

5. The apparatus of claim 1, wherein the memory interface unit includes:

table memory controls, wherein each table memory control of the table memory controls is to receive requests directed to one of the tables and is coupled to at least one table block allocated to a table to which requests are received; and shared memory selection devices, wherein each shared memory selection device of the shared memory selection devices is coupled to the table memory control and all shared memory blocks, wherein the table memory control sends a select signal to the shared memory selection device coupled to the table memory control to only send the request to the shared memory block allocated to the table including the target address.

6. The apparatus of claim 5, further comprising:

an ownership control register indicating each of the shared memory blocks as allocated to one of the tables; and shared memory block selection devices coupled to the shared memory blocks, wherein one of the shared memory block selection devices is coupled to one of the shared memory blocks, wherein each of the shared memory selection devices is coupled to all of the shared memory block selection devices, wherein each of the shared memory block selection devices is to:

receive a select signal derived from the ownership control register indicating to select input from a shared memory selection device for the table allocated to a shared memory block coupled to the shared memory block selection device, to output to the shared memory block.

7. The apparatus of claim 1, wherein the tables store compressed state transitions from a deterministic finite automata (DFA), further comprising:

a decompression unit to decompress the state transitions from the tables to determine state transitions to use to validate an input string.

8. The apparatus of claim 1, wherein a first table of the tables comprises leader state transitions and a second table of the tables stores a set of member state transitions for each leader state transition, wherein member state transitions for one of the leader state transitions differ from the leader state transitions by at least one character, wherein the leader and member state transitions are concurrently requested from the first and second tables.

9. An apparatus coupled to a memory device including a plurality of blocks of memory cells, comprising:

a memory interface unit including:

interface circuitry to connect to tables configured in the memory device, wherein each table of the tables is comprised of table blocks of memory addresses dedicated to the table, wherein at least one table of the tables is further allocated at least one shared memory block of shared memory blocks, wherein shared memory blocks are allocated to the tables through updates to firmware, wherein an address mapping is implemented in pre-configured logic circuits that maps ranges of addresses to the table blocks and the shared memory blocks of the memory device, wherein the interface circuitry is to:

receive requests to target addresses to access tables, wherein the tables are stored in the shared memory blocks; and for each request of the requests to a target address for a target table of the tables, determine from the address mapping whether the target address is to a table block dedicated to the target table or a shared memory block allocated to the target table;

route the request to a shared memory block allocated to the target table in response to the address mapping indicating that the target address maps to the shared memory block allocated to the target table; and an ownership control register indicating each of the shared memory blocks as allocated to one of the tables, wherein the ownership control register controls circuitry to restrict requests to a table to the shared memory block allocated to the table.

10. The apparatus of claim 9, wherein the memory interface unit includes:
 table memory controls, wherein each table memory control of the table memory controls is to receive requests directed to one of the tables; and
 shared memory selection devices, wherein each shared memory selection device of the shared memory selection devices is coupled to one table memory control of the table memory control and all the shared memory blocks, wherein the table memory control sends a select signal to the shared memory selection device coupled to the table memory control to only send the request to the shared memory block allocated to the target table including the target address.

11. The apparatus of claim 10, wherein the memory interface unit further includes:
 shared memory block selection devices coupled to the shared memory blocks, wherein one of the shared memory block selection devices is coupled to one of the shared memory blocks, wherein each of the shared memory selection devices is coupled to all of the shared memory block selection devices, wherein each of the shared memory block selection devices is to:
  receive a select signal derived from the ownership control register indicating to select input from a shared memory selection device for the table allocated to the shared memory block coupled to the shared memory block selection device, to output to the shared memory block.

12. The apparatus of claim 9, wherein the ownership control register is dynamically configurable to enable any of the shared memory blocks to be allocated to any of the tables.

13. A computer program product to generate firmware for a memory device having a plurality of blocks of memory cells, wherein the computer program product comprises at least one computer readable storage medium including program code executed by a processor to:
 receive a table having table entries to store in table blocks of memory cells dedicated to the received table in the memory device;
 determine that table entries in the received table exceed a capacity of the table blocks dedicated to the received table in the memory device;
 allocate at least one shared memory block of shared memory blocks in the memory device to store the received table entries that exceed the capacity of a dedicated table block in the memory device to store the received table; and
 generate a firmware package indicating the allocation of the at least one shared memory block to the received table to store in the memory device, wherein deployment of the firmware package to the memory device causes the memory device to store the table entries for the received table in the dedicated table blocks for the received table and the at least one shared memory block allocated to the table.

14. The computer program product of claim 13, wherein the program code is further executed to:
 determine whether table entries for each table of a plurality of tables exceed a capacity of at least one dedicated table block dedicated to store entries for the table, wherein the shared memory blocks allocated to at least one table are to store the table entries that exceed the capacity of the at least one dedicated table block, wherein the deployment of the firmware package further causes the memory device to store the table entries for each of the tables in the dedicated table blocks and the shared memory blocks allocated to the table.

15. The computer program product of claim 13, wherein the program code is further executed to:
 generate an ownership control register indicating each of the shared memory blocks as allocated to one of a plurality of tables; and
 include the ownership control register in the firmware package.

16. The computer program product of claim 13, wherein the allocation of the shared memory blocks to tables comprises an allocation that is a member of a set of allocations comprising:
 all of the shared memory blocks are allocated to one of the tables;
 none of the shared memory blocks are allocated to any of the tables; and
 shared memory blocks are allocated to multiple of the tables.

17. A method to process requests to target address to access tables stored in a memory device including a plurality of blocks of memory cells, comprising:
 configuring a memory interface unit, including interface circuitry, to connect to tables configured in the memory device, wherein each table of the tables is comprised of table blocks of memory addresses dedicated to the table, wherein at least one table of the tables is further allocated at least one shared memory block of shared memory blocks, wherein shared memory blocks are allocated to the tables through updates to firmware, wherein an address mapping is implemented in pre-configured logic circuits that maps ranges of addresses to the table blocks;
 receiving requests to target addresses to access tables; and
 for each request of the requests to a target address for a target table of the tables, determining from the address mapping whether the target address is to a table block dedicated to the target table or a shared memory block allocated to the target table;
 routing the request to a table block dedicated to the target table in response to an address mapping implemented in pre-configured logic circuits of the memory device that maps ranges of addresses to the blocks in the memory device indicating that the target address maps to the table block dedicated to the target table; and
 route the request to a shared memory block allocated to the target table in response to the address mapping indicating that the target address maps to the shared memory block allocated to the target table.

18. The method of claim 17, wherein the requests to the tables are received on a same clock cycle.

19. The method of claim 17, further comprising:
 restricting requests to a table to the shared memory block allocated to the table using an ownership control register indicating each shared memory block of shared memory blocks as allocated to one of the tables.

20. The method of claim 17, wherein the requests are received at table memory controls, wherein each table memory control of the table memory controls is to receive requests directed to one of the tables; and
 wherein the routing a request to a target address of the requests comprises:
  sending a select signal to a selection device coupled to the table memory control, to output the request to the table block in response to the target address mapping to the table block dedicated to the target table and to output the request to the shared memory block allocated to the target table in response to the target address mapping to the shared memory block allocated to the target table.

21. The method of claim 17, wherein the requests are received at table memory controls, wherein each table memory control of the table memory controls is to receive requests directed to one of the tables and is coupled to at least one table block allocated to a table to which requests are received; and sending, by a table memory control the table memory controls, a select signal to a coupled shared memory selection device to only send the request to the shared memory block allocated to the table including the target address, wherein each shared memory selection device of the shared memory selection devices is coupled to the table memory control and all shared memory blocks.

22. The method of claim 21, further comprising:

receiving a select signal derived from an ownership control register, indicating each of the shared memory blocks as allocated to one of the tables, to select input from a shared memory selection device for the table allocated to a shared memory block coupled to a shared memory block selection device, to output to the shared memory block.

23. The method of claim 17, wherein the tables store compressed state transitions from a deterministic finite automata (DFA), further comprising:

decompressing the state transitions from the tables to determine state transitions to use to validate an input string.

24. The method of claim 17, wherein a first table of the tables comprises leader state transitions and a second table of the tables stores a set of member state transitions for each leader state transition, wherein member state transitions for one of the leader state transitions differ from the leader state transitions by at least one character, wherein the leader and member state transitions are concurrently requested from the first and second tables.

* * * * *